United States Patent
Ferlin

(10) Patent No.: US 9,846,868 B2
(45) Date of Patent: Dec. 19, 2017

(54) METHOD AND SYSTEM FOR IMPROVING THE COLLECTION SYSTEMS

(71) Applicant: BANQUE ACCORD, Croix (FR)

(72) Inventor: Benoit Ferlin, Hallennes-lez-Haubourdin (FR)

(73) Assignee: ONEY BANK, Croix (FR)

( * ) Notice: Subject to any disclaimer, the term of this patent is extended or adjusted under 35 U.S.C. 154(b) by 383 days.

(21) Appl. No.: 14/122,876

(22) PCT Filed: May 23, 2013

(86) PCT No.: PCT/FR2013/051131
§ 371 (c)(1),
(2) Date: Apr. 14, 2014

(87) PCT Pub. No.: WO2014/044934
PCT Pub. Date: Mar. 27, 2014

(65) Prior Publication Data
US 2014/0214576 A1    Jul. 31, 2014

(30) Foreign Application Priority Data
Sep. 24, 2012 (FR) ...................... 12 58914

(51) Int. Cl.
*G06G 1/12* (2006.01)
*G06Q 20/20* (2012.01)
*G06Q 30/06* (2012.01)

(52) U.S. Cl.
CPC ........... *G06Q 20/202* (2013.01); *G06Q 30/06* (2013.01)

(58) Field of Classification Search
CPC ..................................................... G06Q 20/202
USPC ........................................................... 705/21
See application file for complete search history.

(56) References Cited

U.S. PATENT DOCUMENTS

2014/0222545 A1* 8/2014 Hajji .................... G06Q 20/20
705/14.38

FOREIGN PATENT DOCUMENTS

GB    WO 2013008041 A1 *  1/2013  ........... G06Q 20/202

* cited by examiner

*Primary Examiner* — A Hunter Wilder
(74) *Attorney, Agent, or Firm* — Sughrue Mion, PLLC

(57) ABSTRACT

A method of updating a cash register system (10) including a cash register program (1) configured to interact with at least one cash register peripheral (4) under the control of a control module (5). The method includes a step of inspection, at the control module (5), of the interactions between the cash register program (1) and the at least one cash register peripheral (4); a step of processing at least one inspected interaction, the processing step being selected from within the group including the reformulation of an interaction, the modification of an interaction, the copying of an interaction, the extraction of data from an interaction, the reorientation of an interaction.

5 Claims, 1 Drawing Sheet

METHOD AND SYSTEM FOR IMPROVING THE COLLECTION SYSTEMS

Figure 1:
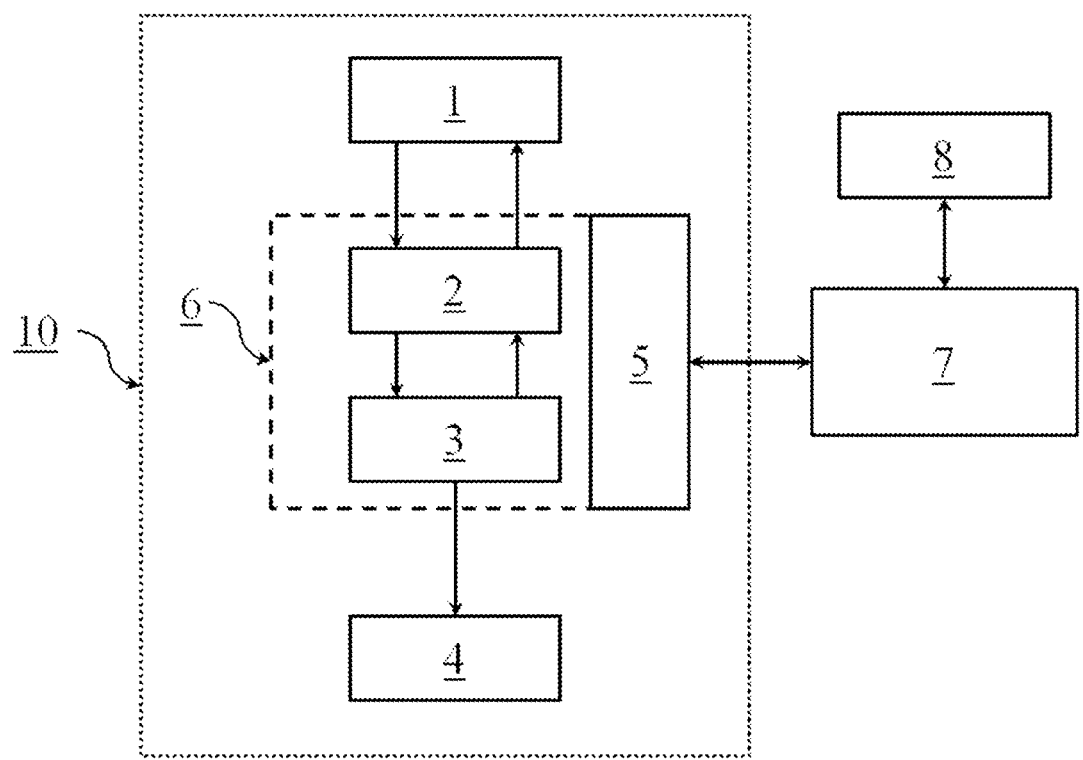

The present invention concerns the technical domain of cash register systems.

"Cash register system" is understood hereinafter as being any computerized system organized for the management of one or more points of sale of products and/or services offered for sale by the unit. The term "management" should be understood in the broader sense as comprising any activity relating to, in particular, the recording, payment, billing, customer loyalty or administration.

A point of sale designates here any place where products (for example agri-food products, clothing, medications, electronics) and/or services (for example restaurant, hotel, travel, subscriptions, entertainment), irrespective of the size or domain of activity, are sold. For example, a point of sale can be a hotel, hotel chain, restaurant, bakery, pharmacy, department store, small grocery store, supermarket, superstore, shopping center, shopping arcade, or more generally any commercial business.

A cash register system primarily comprises a computer program product or more generally a computerized product, designated hereinafter by the expression "cash register program," configured to communicate with a plurality of cash register hardware peripherals such as a sales receipt printer, a customer display, a barcode reader, the cash drawer, a bank card reader.

With the development of computerized data processing, cash register programs offer a greater and greater degree of automation by taking over more and more tasks of the sales personnel and/or the customer during the checkout process. Indeed, most current cash register programs are arranged to manage a plurality of operations that would otherwise be time-consuming, such as identification and recording of the items to be purchased, customer information, the printing of the sales receipt, management of customer loyalty program, management of commercial benefits, management of payment, production of sales reports, gross sales reports or inventory reports.

Of course, there are cash register programs under different operating systems (such as Windows™, Linux or Unix) and with different standards of communicating with the cash register peripherals (such as OPOS for "OLE for points of retail sale," or "OLE for Point of Sale/Service," UPOS for "Unified POS," or JavaPOS).

In the early days of their use, cash register programs had to meet the needs of point-of-sale management. However, over time, improvements or modifications had to be made for various reasons.

For example, in order to ensure the highest degree of convenience and satisfaction for customers, the point of sale should be equipped with an up-to-date cash register program with the most recent technological advances. This can include modifications relating to, for example,

- support for mobile payment via a mobile terminal, such as a portable telephone or smartphone, available to the customer;
- paperless receipts communicated to customers by SMS, email or via short-range communication interface (infrared, Bluetooth® for example) instead of automatically printing them;
- a mobile application (installed on a mobile terminal such as a smartphone) intended to interact, preferably by wireless interface, directly or indirectly, with the cash register program (deployed in a self-service checkout or conventional cash register system),
  communicating to it the identifiers (for example tags, barcodes, serial numbers, names) of items/services to be checked out (thus avoiding the manual entry or use of the cash register barcode reader); or
- furnishing/requesting information concerning a customer loyalty card (for example, furnishing the identifier/number of a loyalty card, requesting the number of loyalty points, requesting the monetary equivalent of loyalty points);
- requesting information concerning the checkout (for example discount rates, total excluding taxes, electronic invoice, electronic receipt, gift receipt: a sales receipt without price, rate of exchange in the event of payment in foreign currency).

Similarly, a cash register program in some cases should be adapted to integrate a new cash register peripheral or to replace one or more existing cash register peripherals. Non-limiting examples are:

- replacing a display screen, mouse and/or keyboard with a touch screen;
- integrating a recognition module (for example, biometric) for the sales personnel (i.e., the cashier);
- integrating a new module for automating a certain payment mode not included in the original, such as by check, discount coupon, restaurant voucher, credit note or gift certificate;
- changing a communication interface (for example, using a USB2 controller instead of an RS-232 series controller, or a Wi-Fi or Bluetooth® connection instead of an Ethernet connection).

Also, after any change in the checkout procedure or more generally in the commercial strategy of a point of sale, it is determined that the cash register program should be modified, for example,

- to modify and/or rearrange the contents of the sales receipts such as printing a sales receipt without price (upon request of the customer), sorting of the items/services in the sales receipt (normal prices vs. sales prices, items/services by family, items in order of increasing price);
- to automatically give the customer a commercial benefit (for example discount coupon, discount, loyalty points) when certain item(s)/service(s) are purchased;
- to program different schedules of prices (for example sales, promotions, weekend, vacations, customers, subscribers, business personnel);
- change in management of customer loyalty program (to take into account the number of times through the checkout, total amount of purchase per checkout, or the purchase of certain items/services);

Other reasons for modifying a cash register program can be considered, rightly or wrongly.

Furthermore, after its installation in a cash register system, a cash register program is likely to be modified multiple times.

To do this, corrections or changes to the source code are regularly made to the cash register program.

However, because a cash register program is generally developed in response to a very specific set of specifications, the accumulation of multiple corrections/modifications certainly makes that cash register program unstable. Moreover, the result is generally a non-optimal, complex program (accumulation of problems), requiring additional tasks/manipulations by the sales personnel and/or the customer (for example, because a certain functionality is not provided by the original design/architecture of the cash register program).

Furthermore, the operation of a cash register program deployed at numerous cash registers of a superstore, particularly multi-site, can only be tedious and very expensive. This approach also makes the point of sale dependent on the publishers and integrators of cash register programs.

Moreover, bearing in mind that an interruption in sales for a point of sale (particularly a superstore) is unacceptable, the installation of a new cash register program and/or the operation of a cash register program in use by multiple cash registers is inconceivable.

It should also be noted that, following any modification of the source code of a cash register program, the program must undergo a series of tests in a cash register system under real conditions. This verification and validation step is tedious to carry out and very resource-intensive.

An object of the present invention is to overcome the limitations of the prior art.

Another object of the present invention is to be able to improve (upgrade) a cash register system while keeping its cash register program as light as possible.

Another object of the present invention is to be able to make changes more easily to an existing cash register system.

Another object of the present invention is to be able to easily adapt an existing cash register system to the changing and individual needs of a point of sale.

Another object of the present invention is to reduce the cost of deploying and upgrading a cash register system.

To that end, according to a first aspect, the invention relates to a method of updating a cash register system including a cash register program configured to interact with at least one cash register peripheral under the control of a control module, said method comprising a step of inspection, at the control module, of the interactions between said cash register program and said at least one cash register peripheral;

a step of processing at least one inspected interaction, said processing step being selected from within the group including the reformulation of an interaction, the modification of an interaction, the copying of an interaction, the extraction of data from an interaction, the reorientation of an interaction.

According to a second aspect, the invention relates to a cash register system including a cash register program configured to interact with at least one cash register peripheral under the control of a control module, said cash register system comprising a connection module configured to inspect, at the control module, the interactions between said cash register program and said at least one cash register peripheral;

to process at least one inspected interaction, said processing being selected from within the group including the reformulation of an interaction, the modification of an interaction, the copying of an interaction, the extraction of data from an interaction, the reorientation of an interaction.

According to a more general aspect of the invention, the connection module is further configured to simulate at least one interaction between said cash register program and said at least one cash register peripheral.

According to another more general aspect of the invention, the connection module is further configured to communicate, to a third-party application, at least one item of information concerning an interaction between said cash register program and said at least one cash register peripheral.

According to a third aspect, the invention relates to a computer program product implemented on a storage medium, capable of being run on an electronic data processing unit and comprising instructions for the implementation of the method summarized above.

Other characteristics and advantages of the invention will appear more clearly and in more detail from the following description of preferred embodiments, provided with reference to the appended FIG. 1, which diagrammatically illustrates a non-limiting functional representation of one embodiment.

Shown in FIG. 1 is a cash register system 10, at a point of sale, comprising a cash register program 1.

The cash register program 1 can be installed in a network, and therefore connected to a plurality of other cash registers, databases, and/or servers. The cash register program 1 can be in any programming language (for example Visual C++ or Visual Basic) that supports COM (Component Object Model) models.

The cash register program 1 is compatible with at least one communication standard 6 such as OPOS (OLE for Retail POS, Application Programmer's Guide, http://monroecs.com/oposreleases.htm), UPOS (UnifiedPOS Retail Peripheral Architecture, International Standard For Implementation of point Of Service Peripherals, http://monroecs.com/unifiedpos.htm), or JavaPOS (Java for Retail POS, Programming Guide, International Standard For Implementation of POS Peripherals on a Java Based System, http://monroecs.com/javapos.htm), in order to interact with different cash register peripherals 4, from different manufacturers respectively provided with drivers compatible with said standard 6, such as a receipt/check/barcode printer, customer display, touch screen, keyboard, barcode scanner (handheld, built-in/portable), a cash drawer, an electronic payment terminal (EPT).

The standard 6, particularly the OPOS standard, which is generally considered to be a particular case of the more general UPOS standard, defines an architecture in which the interface with a peripheral 4 (particularly an OPOS peripheral 4) comprises two software modules:

a first software module 2, called "Control Object" (CO), independent of the cash register peripheral 4; and a second software module 3, called "Service Object" (SO), dependent on the cash register peripheral 4.

Control objects 2 and service objects 3 are accessible at the Web site http://monroecs.com/oposccos.htm (September 2012).

Indeed, the interactions between the cash register program 1 and any peripheral 4 compatible with the standard 6 transit through the communications control module 5 (for example, ActiveX control) according to standard 6. The cash register program 1 interacts with the cash register peripherals 4 under the control of the control module 5.

A connection module 7 connected to the control module 5 of the standard 6 is configured to inspect (identify) predefined interactions/communications between the cash register application 1 and a certain cash register peripheral 4 compatible with the standard 6 (a communication from the cash register program 1 to a cash register peripheral 4 or vice versa);

process said inspected/identified interactions, such as for example transferring, reorienting, copying, reformulating, modifying, blocking, extracting/collecting/deducing information concerning an inspected interaction;

simulate one or more interactions between a certain cash register peripheral 4 and the cash register application 1

(said interaction being from the cash register peripheral 4 to the cash register application, or vice versa).

In other words, the connection module 7 makes it possible to inspect (scan/probe), at the control module 5 of the standard 6, the interactions between the cash register program 1 and the cash register peripherals 4, as well as to simulate/imitate a cash register peripheral 4 in its interactions (response/request) with the cash register program 1 and vice versa. Non-exhaustive examples of interactions between the cash register program 1 and the cash register peripherals 4 are the scanning of certain barcodes, pressing a certain key of a touch screen, sending certain information to be displayed, or sending an acknowledgment of receipt.

The inspection of interactions between the cash register program 1 and the cash register peripheral 4 can be obtained, for example, by any means of monitoring whatever is transiting through the message management system of the operating system. For example, some interactions can be inspected using Windows® "Hooks" ("Microsoft Developer Network (MSDN): Hooks," http://msdn.microsoft.com/enus/library/ms632589(v=VS.85).aspx, 2012). In fact, the installation of "Hooks" makes it possible to intercept low-level events (such as data to be displayed on the screen or keystrokes on a keyboard or touch screen) before a target application and/or peripheral receives them.

As a variant or in combination, the inspection of interactions between the cash register program 1 and the cash register peripheral 4 can be accomplished by driver rewrite. This driver rewrite technique, for example, makes it possible to capture the flow (such as the contents of a discount coupon) sent to a printer connected to a parallel port in order to extract information from it.

Advantageously, in one implementation, the connection module 7 is a connection singleton (Design Pattern) enabling the different possible interactions between a cash register program 1 and different cash register peripherals 4 to be formally described.

Moreover, the connection module 7 is further configured to interact with a third-party application 8
by sending to it (communicating) information concerning interactions between the cash register program 1 and a cash register peripheral 4; or
by simulating one or more interactions of a certain cash register peripheral 4 with the cash register application 1, in response to a request that the third-party application 8 has sent to it.

The third-party application 8 can be any application offering functionalities not provided by the cash register program 1, such as mobile payment, paperless discount coupons or cash receipts, and communication with mobile applications.

The third-party application 8 can be, in particular, an application appended to the cash register system 10 or at a remote site responsible for a plurality of points of sale.

In one illustrative implementation, the third-party application 8 is a mobile payment terminal. In this case, the connection singleton 7 is configured to
recover information concerning a transaction in progress (particularly, the amount to be paid);
transmit said information to the mobile payment terminal 8 responsible for the mobile payment;
depending on the response of the mobile payment terminal 8, simulate the response of a payment means supported by the cash register program 1 (for example, simulate the response of a bank card reader concerning the settlement of a transaction).

Information concerning a purchase in progress can be obtained by intercepting the information communicated by the cash register program 1, for example, to the customer display, or to a means of payment supported by the cash register system (for example a bank card reader).

In another illustrative implementation, the third-party application 8 is an application to verify the cash register program 1 (following a modification made to the cash register program 1, when a new cash register peripheral is integrated, or a new cash register program 1 is deployed) in order to detect possible anomalies. For this purpose, the connection singleton 7 is configured to simulate a cash register procedure:
simulating the entry and/or reading of identifiers (barcode scan) of items/services;
simulating predefined scenarios, such as operations for correction, cancellation, offer, rebate, purchase waiver, management of customer loyalty points, control of authorization levels;
redirecting information, or a copy of information communicated by the cash register program 1 to the cash register peripherals 4 (receipt printer, customer display, cash drawer, bank card reader for example) to the third-party application 9 to compare it with the expected results. Advantageously, this provides for the automatic verification of the cash register program 1.

In another illustrative implementation, in order to integrate into the cash register system 10 a cash register peripheral provided with a driver that is incompatible with the standard 6 (here, therefore, the third-party application is the driver of the new cash register peripheral), the connection module 7 is responsible for adapting/translating (in both directions) the interactions of the cash register system 1 with the driver 8 of the new peripheral.

Moreover, the connection module 7 can be programmed to perform, for example, excellent control of a certain cash register peripheral having configuration parameters not provided by the cash register program 1 (for example, for a receipt printer: color, front-back, watermark, overprint). For this purpose, the connection module 7
identifies each message intended for said peripheral;
modifies said message, or alternatively generates a new message with new parameters; and
transfers the modified or generated message to the cash register peripheral in question.

In another illustrative implementation relating to the cash register procedure, for example, concerning
the management of a customer loyalty program and/or subscriptions: a mobile application installed in a mobile terminal equipped with a communication interface, preferably short-range, that the user presents at a wireless terminal 8 responsible for interacting with the mobile application. For this purpose, the connection module 7 is configured to recover/transmit information concerning a subscription (validity for example) or a loyalty program card (loyalty points for example);
paperless sales receipt/discount coupons: sending the contents or a part of the contents of a sales receipt or discount coupons or any other commercial benefit to a user terminal of the customer (telephone, computer for example). In this case, the connection singleton 7 is configured to
intercept the print order intended for the sales receipt printer;
recover the data intended to be printed, and possibly process said data (for example sorting, extracting);

send said data, possibly processed, to a modem 8 configured to communicate said data to the customer's user terminal (information concerning the customer, such as the telephone number or email address can be obtained from a customer account or a loyalty card);

simulate the acknowledgment of receipt of the printer and send it to the cash register program 1 instead of the printer.

In another illustrative implementation, the connection module 7 is responsible for sending to a centralized control unit 8 of the point of sale, for example, alert messages issued by the cash register system 10 (for example, an alert message about ink level issued by a printer). In this case, the connection module 7 is programmed to detect any alert message from a cash register peripheral 4 intended for the cash register program 1, and to send a copy of said message to the centralized control unit 8;

inspect any information communicated to and/or received at/from a certain peripheral (for example, the bank card reader, a sales receipt printer) and communicate said information in real time to the centralized control unit 8 (which can be a central teller, or an inventory management application).

It should be noted that the method and system of improving cash register systems described above are independent of the operating system on which the cash register program 1 is installed. Indeed, this solution can be incorporated into any cash register system 10 comprising a cash register program 1 compatible with a standard 6 for communicating with cash register peripherals 4 via a control module 5.

The examples of the OPOS or UPOS standards are obviously not limiting, and can be replaced by any other equivalent standard.

It should be noted that, given the generally high level of data processing security in cash register systems, a person skilled in the art was not encouraged to handle the communications between a cash register program and the cash register peripherals.

Advantageously, the method and system just described make it possible to greatly facilitate improving cash register systems without any modification of the cash register programs;

to use a cash register program without being limited solely to the functionalities furnished by said program;

to test new versions of cash register programs;

to extend the life of aging cash register programs;

to facilitate access and integration of new technologies into existing cash register systems.

The invention claimed is:

1. A method of updating a cash register system including a cash register program configured to interact with at least one cash register peripheral under the control of a control module, said method comprising:

inspecting at the control module, by a connection module, interactions between said cash register program and said at least one cash register peripheral;

communicating, by the connection module to a third-party application, at least one item of information concerning one or more of the interactions inspected between said cash register program and said at least one cash register peripheral, the third-party application being a mobile payment terminal;

receiving a request by the third-party application at the connection module;

simulating the one or more of the interactions of said at least one cash register peripheral with said cash register program, by the connection module, in response to receiving the request; and updating at least one interaction of the one or more interactions simulated by the connection module, said updating being selected from within the group including reformulation of the at least one interaction, modification of the at least one interaction, copying of the at least one interaction, extraction of data from the at least one interaction, and reorientation of the at least one interaction.

2. A cash register system including a cash register program configured to interact with at least one cash register peripheral under the control of a control module, said cash register system comprising:

a connection module configured to:

inspect at the control module the interactions between said cash register program and said at least one cash register peripheral;

communicate to a third-party application at least one item of information concerning one or more interactions inspected between said cash register program and said at least one cash register peripheral, the third-party application being a mobile payment terminal;

receive a request by the third party application;

simulate one or more interactions of said at least one cash register peripheral with said cash register program in response to receiving the request; and update at least one simulated interaction of the simulated one or more interactions, said update being selected from within the group including reformulation of the at least one simulated interaction, modification of the at least one simulated interaction, copying of the at least one simulated interaction, extraction of data from the at least one simulated interaction, and reorientation of the at least one simulated interaction.

3. The system according to claim 2, wherein the connection module is a connection singleton or Design Pattern enabling the different possible interactions between said at least one cash register peripheral with said cash register program.

4. The system according to claim 2, wherein the control module is a communications control module according to the OPOS or UPOS standard.

5. A computer program product, comprising a non-transitory storage medium configured for being run on an electronic data processing unit and comprising instructions for the implementation of a cash register program configured to interact with at least one cash register peripheral under the control of a control module, comprising:

inspecting at the control module, by a connection module, interactions between said cash register program and said at least one cash register peripheral;

communicating to a third-party application at least one item of information concerning one or more of the interactions inspected between said cash register program and said at least one cash register peripheral, the third-party application being a mobile payment terminal;

receiving, by the connection module, a request by the third-party application;

simulating, by the connection module, the one or more of the interactions of said at least one cash register peripheral with said cash register program in response to receiving the request; and updating at least one interaction of the one or more of the interactions simulated by the connection module, said updating being selected from within the group including reformulation of the at least one interaction, modification of the at least one interaction, copying of the at least one interaction, extraction of data from the at least one interaction, and reorientation of the at least one interaction.

* * * * *